United States Patent
Ito

(10) Patent No.: US 7,367,289 B2
(45) Date of Patent: May 6, 2008

(54) CONTROL SYSTEM FOR HYDROGEN ADDITION INTERNAL COMBUSTION ENGINE

(75) Inventor: Yasushi Ito, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 54 days.

(21) Appl. No.: 10/593,238

(22) PCT Filed: Jul. 27, 2005

(86) PCT No.: PCT/JP2005/014147

§ 371 (c)(1),
(2), (4) Date: Sep. 18, 2006

(87) PCT Pub. No.: WO2006/013868

PCT Pub. Date: Feb. 9, 2006

(65) Prior Publication Data

US 2007/0193534 A1    Aug. 23, 2007

(30) Foreign Application Priority Data

Aug. 4, 2004    (JP)    ............... 2001-227812

(51) Int. Cl.
*F02B 43/00*    (2006.01)
*F02M 33/02*    (2006.01)

(52) U.S. Cl. ............... 123/1 A; 123/520; 123/DIG. 12

(58) Field of Classification Search ............... 123/1 A, 123/518–521, 698, DIG. 1
See application file for complete search history.

(56) References Cited

U.S. PATENT DOCUMENTS

| | | | |
|---|---|---|---|
| 3,906,913 A | 9/1975 | Rupe | |
| 5,413,075 A | 5/1995 | Mamiya et al. | |
| 5,546,902 A | 8/1996 | Paluch et al. | |
| 6,463,889 B2 * | 10/2002 | Reddy | ............... 123/3 |

FOREIGN PATENT DOCUMENTS

| | | |
|---|---|---|
| JP | A 6-200805 | 7/1994 |
| JP | A 2001-295708 | 10/2001 |
| JP | A 2004-116398 | 4/2004 |

* cited by examiner

*Primary Examiner*—Noah P. Kamen
(74) *Attorney, Agent, or Firm*—Oliff & Berridge, PLC

(57) ABSTRACT

Disclosed is a control system for a hydrogen addition internal combustion engine that uses hydrocarbon fuel and hydrogen gas as combustion fuel. The control system includes a canister 52 for adsorbing fuel vapor generated in a tank 34 for storing the hydrocarbon fuel; a purge VSV 66 for purging the fuel vapor into an intake port 18 of the hydrogen addition internal combustion engine in a predefined situation; hydrogen addition ratio setup means for setting the ratio of hydrogen gas addition to the hydrocarbon fuel; and hydrogen gas addition ratio adjustment means for increasing the ratio of hydrogen gas addition when the fuel vapor is purged into the intake port 18.

4 Claims, 2 Drawing Sheets

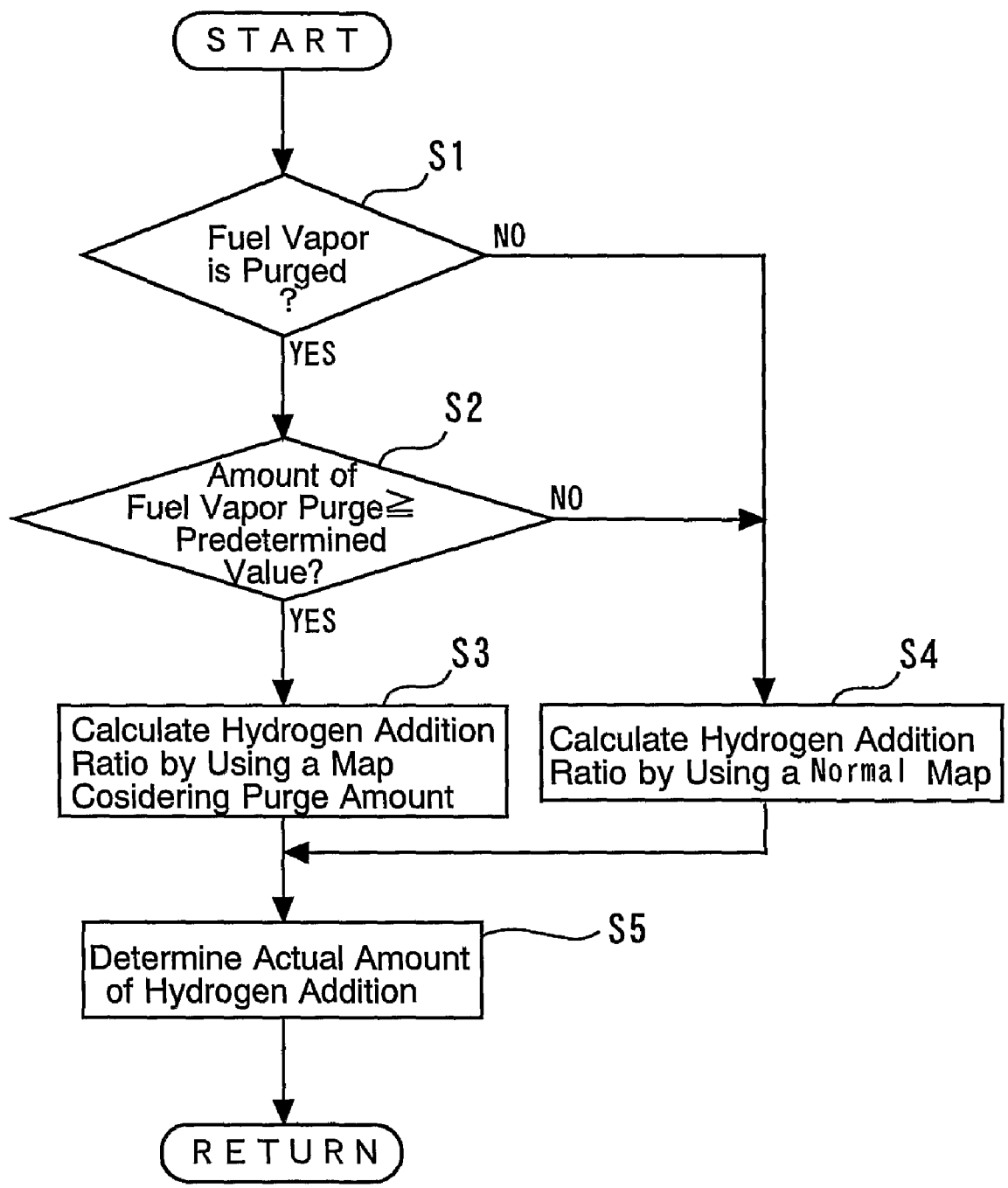

US 7,367,289 B2

CONTROL SYSTEM FOR HYDROGEN ADDITION INTERNAL COMBUSTION ENGINE

TECHNICAL FIELD

The present invention relates to a control system for a hydrogen addition internal combustion engine.

BACKGROUND ART

It is known that an internal combustion using gasoline as fuel reduces the amount of nitrogen oxide ($NO_x$) in an exhaust gas when hydrogen gas is supplied in addition to gasoline. A technology disclosed, for instance, by Japanese Patent Laid-open No. 2004-116398 determines the hydrogen addition ratio so as to reduce the NOX exhaust amount, and operates an internal combustion engine by injecting gasoline and hydrogen in accordance with the determined ratio.

[Patent Document 1]
Japanese Patent Laid-open No. 2004-116398

[Patent Document 2]
Japanese Patent Laid-open No. Hei 6-200805

However, if the internal combustion engine includes a canister for adsorbing vaporized fuel (fuel vapor) in a gasoline tank, the amount of vaporized fuel purged from the canister to an intake path cannot be accurately controlled. Therefore, even when hydrogen gas is supplied, unstable combustion results.

It is difficult to accurately control the air-fuel ratio in an engine cylinder particularly when a large amount of vaporized fuel is purged from the canister to the intake path. Consequently, the air-fuel ratio is likely to shift toward the lean side or rich side. Unstable combustion then results, thereby causing emission and driveability to deteriorate.

DISCLOSURE OF THE INVENTION

The present invention has been made to solve the above problem. It is an object of the present invention to maintain stable combustion when vaporized fuel adsorbed by the canister is purged in an internal combustion engine to which gasoline and hydrogen gas are both supplied.

According to first aspect of the present invention, a control system for a hydrogen addition internal combustion engine that uses hydrocarbon fuel and hydrogen gas as combustion fuel, the control system comprises a canister, purge means, hydrogen addition ratio setup means, and hydrogen gas addition ratio adjustment means. The canister adsorbs fuel vapor generated in a tank for storing the hydrocarbon fuel. The purge means purges the fuel vapor into an intake path of the hydrogen addition internal combustion engine in a predefined situation. The hydrogen addition ratio setup means sets the ratio of hydrogen gas addition to the hydrocarbon fuel. The hydrogen gas addition ratio adjustment means increases the ratio of hydrogen gas addition when the fuel vapor is purged into the intake path.

When the fuel vapor is purged into the intake path, the first aspect of the present invention increases the ratio of hydrogen gas addition. It is therefore possible to inhibit the combustion state in a cylinder from deteriorating due to the fuel vapor purge. As a result, good emission and driveability can be offered during a fuel vapor purge.

According to a second aspect of the present invention, there is provided the control system for a hydrogen addition internal combustion engine, which is improved as described above, wherein the hydrogen gas addition ratio adjustment means increases the ratio of hydrogen gas addition when the amount of fuel vapor purge into the intake path is not smaller than a predetermined value.

when the amount of fuel vapor purge into the intake path is not smaller than a predetermined value, the second aspect of the present invention increases the ratio of hydrogen gas addition. It is therefore possible to suppress the hydrogen use under the situation that the amount of fuel vapor purge is very little and that the combustion state is not influenced much by fuel vapor purge.

Other and further objects, features and advantages of the invention will appear more fully from the following description.

BRIEF DESCRIPTION OF DRAWINGS

FIG. 2 illustrates the processing steps performed by the system according to an first embodiment.

BEST MODE FOR CARRYING OUT THE INVENTION

Figure 1:
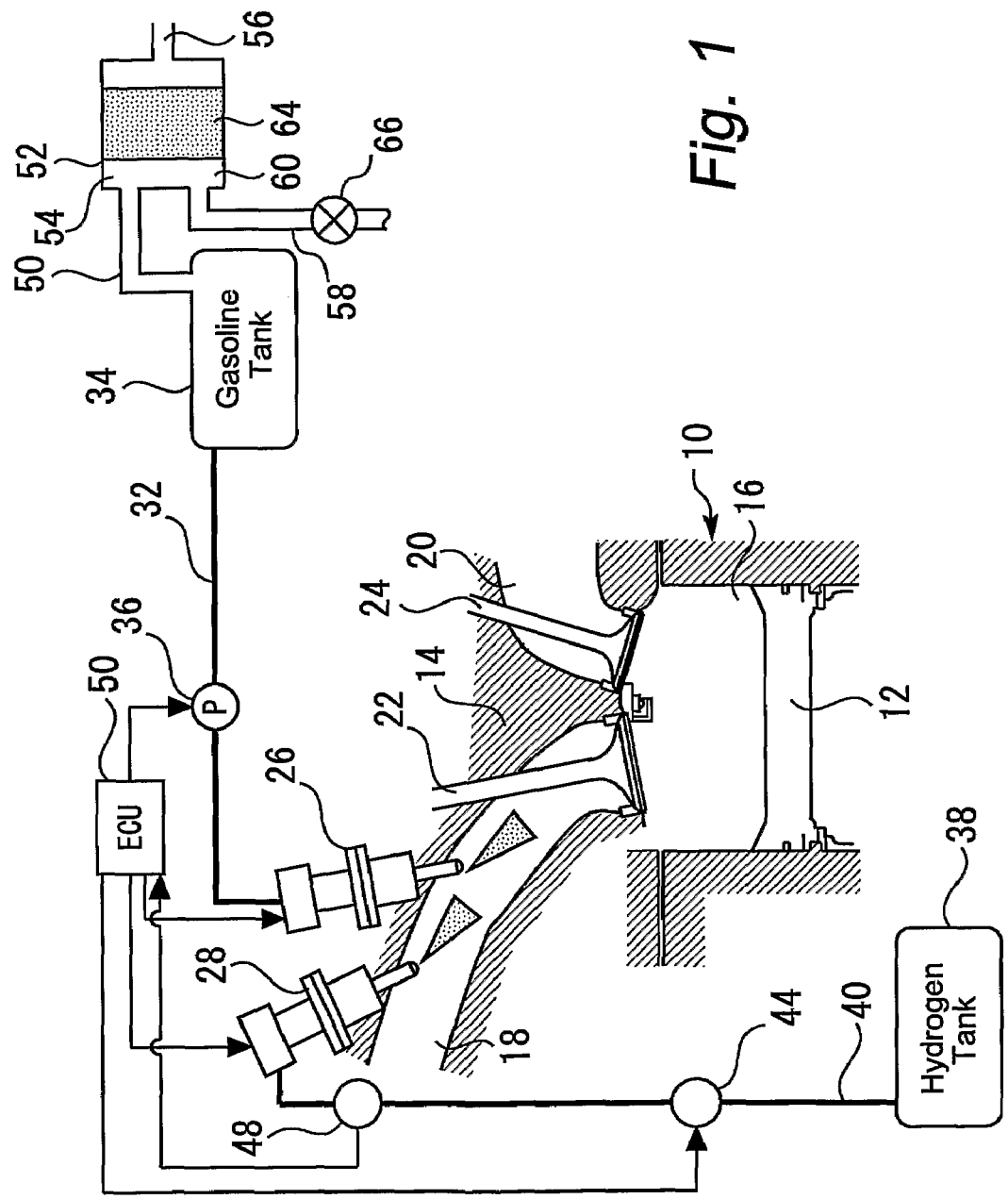
FIG. 1 illustrates the configuration of a system that is equipped with a hydrogen addition internal combustion engine according to an embodiment of the present invention.

An embodiment of the present invention will now be described with reference to the accompanying drawings. Like elements in the drawings are designated by like reference numerals and will not be described repeatedly. The present invention is not limited to the embodiment described below.

FIG. 1 illustrates the configuration of a system that is equipped with a hydrogen addition internal combustion engine 10 according to an embodiment of the present invention. A cylinder of the internal combustion engine 10 contains a piston 12, which reciprocates within the cylinder. The internal combustion engine 10 also includes a cylinder head 14. A combustion chamber 16 is formed between the piston 12 and cylinder head 14. The combustion chamber 16 communicates with an intake port 18 and an exhaust port 20. The intake port 18 and exhaust port 20 are respectively provided with an intake valve 22 and an exhaust valve 24.

The intake port 18 is provided with a gasoline injection valve 26, which injects gasoline into the intake port 18. The intake port 18 is also provided with a hydrogen fuel port injection valve 28, which injects hydrogen into the intake port 18.

The gasoline injection valve 26 communicates with a gasoline tank 34 via a gasoline supply pipe 32. The gasoline supply pipe 32 is provided with a pump 36, which is positioned between the gasoline injection valve 26 and gasoline tank 34. The pump 36 is capable of generating a predetermined pressure to supply gasoline to the gasoline injection valve 26. The gasoline injection valve 26 opens when it receives a drive signal that is supplied from the outside, and injects a certain amount of gasoline into the intake port 18. The amount of gasoline injection into the intake port 18 varies with the period of time during which the gasoline injection valve 26 is open.

The system according to the present embodiment includes a hydrogen tank 38, which stores hydrogen in gaseous state under high pressure. The hydrogen tank 38 communicates with a hydrogen supply pipe 40. The hydrogen supply pipe 40 communicates with the hydrogen fuel port injection valve 28. As the hydrogen fuel to be supplied to the hydrogen fuel port injection valve 28, the system according to the present embodiment uses the hydrogen gas that is filled into the hydrogen tank 38 from the outside. However, the present invention is not limited to the use of such hydrogen fuel. An alternative is to use hydrogen-rich gas that contains highly concentrated hydrogen and is generated within a vehicle or supplied from the outside.

The hydrogen supply pipe 40 is provided with a regulator 44. When this configuration is employed, the hydrogen in the hydrogen tank 38 is supplied to the hydrogen fuel port injection valve 28 while the pressure is decreased by the regulator 44 as predefined. Therefore, when the hydrogen fuel port injection valve 28 opens upon receipt of a drive signal that is supplied from the outside, the hydrogen fuel port injection valve 28 injects hydrogen into the intake port 18. The amount of hydrogen injection varies with the period of time during which the hydrogen fuel port injection valve 28 is open.

Further, the hydrogen supply pipe 40 is provided with a fuel pressure sensor 48, which is positioned between the regulator 44 and hydrogen fuel port injection valve 28. The fuel pressure sensor 48 generates an output in accordance with the pressure of the hydrogen supplied to the hydrogen fuel port injection valve 28. The system according to the present embodiment controls the regulator 44 in accordance with the output generated by the fuel pressure sensor 48. Therefore, even when the hydrogen supplied from the hydrogen tank 38 varies in pressure, hydrogen can be supplied to the hydrogen fuel port injection valve 28 under a steady pressure.

The system according to the present embodiment includes an ECU 50. To enable the ECU 50 to grasp the operation status of the internal combustion engine 10, the ECU 50 is connected not only to the aforementioned fuel pressure sensor 48, but also to a KCS sensor for knocking detection and various other sensors (not shown) for detecting, for instance, the throttle opening, engine speed, exhausts temperature, cooling water temperature, lubricating oil temperature, and catalyst floor temperature, etc. The ECU 50 is also connected to actuators such as the aforementioned gasoline injection valve 26, hydrogen fuel port injection valve 28, pump 36, regulator 44, and after-mentioned purge VSV 66, etc. When this configuration is employed, the ECU 50 can arbitrarily select an injection valve to inject fuel in accordance with the operation status of the internal combustion engine 10, and drive the actuators in accordance with the outputs of various sensors.

As shown in FIG. 1, the gasoline tank 34 communicates with a canister 52 via a vapor path 50. The canister 52 is provided with a vapor port 54, which is connected to the vapor path 50, an atmospheric air port 56 for atmospheric air introduction, and a purge port 60, which communicates with a purge path 58 that is described later. The inside of the canister 52 is filled with active carbon 64 for adsorbing vaporized fuel that flows from the vapor port 54. As shown in FIG. 1, the vapor port 54 and purge port 60 are positioned on the same side relative to the active carbon 64. Meanwhile, the atmospheric air port 56 is positioned opposite side to the above-mentioned ports 54, 60 so that the active carbon 64 is sandwiched between the atmospheric air port 56 and the above-mentioned ports 54, 60.

The purge path 58 communicates with the intake port 18 of the internal combustion engine 10. A purge VSV 66 is provided in the middle of the purge path 58 to control the conduction status of the purge path 58. The purge VSV 66 is connected to the ECU 50. The open/close status of the purge VSV 66 is duty cycle controlled in accordance with a drive signal that is supplied from the ECU 50. While the internal combustion engine 10 is operated, the intake negative pressure of the internal combustion engine 10 is introduced into the purge path 58. When the purge VSV 66 opens during such a state, the intake negative pressure reaches the purge port 60 of the canister 52. As a result, air flows from the atmospheric air port 56 to the purge port 60. When such an air flow arises, the fuel adsorbed by the active carbon 64 becomes desorbed. Therefore, when the purge VSV 66 opens properly during an internal combustion engine operation, the system according to the present embodiment causes the fuel adsorbed by the canister 52 to be purged properly into the intake port 18 of the internal combustion engine 10.

When the purge VSV 66 opens to purge the fuel vapor into the intake port 18, the amount of gasoline intake into a cylinder (into the combustion chamber 16) varies so that unstable combustion occurs in a cylinder. Thus, emission and driveability may deteriorate particularly while the engine idles or operates under light load.

Therefore, if the purge amount is greater than a predetermined value when the purge VSV 66 is opened to purge the fuel vapor into the intake port 18, the system according to the present embodiment ensures that the amount of hydrogen injection from the hydrogen fuel port injection valve 28 is larger than normal. Ignitability and flame propagation can then be improved by increasing the hydrogen addition ratio even when the air-fuel ratio changes during a fuel vapor purge. Consequently, it is possible to improve the intra-cylinder combustion status even during a fuel vapor purge, reduce the $NO_x$ exhaust amount, and provide good driveability.

The processing steps performed by the system according to the present embodiment will be described with reference to a flowchart in FIG. 2. First of all, step S1 is performed to judge whether the fuel vapor adsorbed by the canister 52 is purged into the intake port 18 in the current operating state. More specifically, step S1 is performed to judge whether the fuel vapor is purged into the intake port 18 in accordance with the open/close status of the purge VSV 66. If the fuel vapor is purged, the flow proceeds to step S2. If, on the other hand, the fuel vapor is not purged, the flow proceeds to step S4.

Step S2 is performed to judge whether the ratio of the purge-induced fuel amount to the amount of gasoline fuel flow into the combustion chamber 16 is not smaller than a predetermined value. In other words, this step is performed to judge whether the amount of fuel vapor purge from the canister 52 is not smaller than a predetermined value. The fuel vapor purge amount can be determined, for instance, from the feedback correction value for the amount of fuel injection from the gasoline injection valve 26. If a large amount of fuel vapor is purged from the canister 52 into the intake port 18, air-fuel ratio feedback control is exercised to ensure that the amount of fuel injection from the gasoline injection valve 26 is smaller than normal. Therefore, the purge amount can be determined in accordance with the feedback correction value for the gasoline injection amount.

Further, the fuel vapor purge amount can be determined in accordance with the negative pressure in the intake port 18 and the duty ratio for controlling purge VSV 66. When, for instance, a transient operation is performed, the feedback control over the amount of fuel injection from the gasoline injection valve 26 may be delayed with respect to the amount of purge from the canister 52. It is therefore preferred that the purge amount be determined in consideration of the aforementioned feedback correction value, the negative pressure in the intake port 18, and the duty ratio.

If the judgment result obtained in step S2 indicates that the amount of fuel vapor purge from the canister 52 into the intake port 18 is not smaller than the predetermined value, the flow proceeds to step S3. If, on the other hand, the fuel vapor purge amount is smaller than the predetermined vale, the flow proceeds to step S4.

When the flow proceeds to step S3 in which the fuel vapor purge amount is relatively large, the hydrogen addition ratio is calculated from a map that defines the relationship between the purge amount and hydrogen addition ratio. In this instance, the larger the purge amount, the greater the hydrogen addition ratio setting. This ensures that stable combustion occurs during a fuel vapor purge. Consequently, good emission and driveability result.

On the other hand, when the flow proceeds to step S4 in which the fuel vapor amount is zero or relatively small, the hydrogen addition ratio is calculated from the normal map. The hydrogen addition ratio calculated in steps S3 and S4 represents the ratio of hydrogen gas combustion energy to the engine load factor.

After completion of step S3 or S4, the flow proceeds to step S5. Step S5 is performed to determine the actual amount of hydrogen addition from the hydrogen fuel port injection valve 28 in accordance with the hydrogen addition ratio that was determined in step S3 or S4. More specifically, the hydrogen addition amount is determined by determining the load factor from the accelerator opening and engine speed, multiplying the load factor by the hydrogen addition ratio that was determined in step S3 or S4, and multiplying the obtained result by a predetermined coefficient. The internal combustion engine 10 is then operated in accordance with the determined hydrogen addition amount.

When a large amount of fuel vapor is purged from the canister 52 into the intake port 18, the present embodiment can exercise control as described above to provide a greater hydrogen addition ratio than normal. Consequently, the present embodiment makes it possible to inhibit the intra-cylinder combustion status from becoming unstable due to a fuel vapor purge. As a result, good emission and driveability can be offered during a fuel vapor purge.

The invention claimed is:

1. A control system for a hydrogen addition internal combustion engine that uses hydrocarbon fuel and hydrogen gas as combustion fuel, said control system comprising:
    a canister for adsorbing fuel vapor generated in a tank for storing said hydrocarbon fuel;
    purge means for purging said fuel vapor into an intake path of said hydrogen addition internal combustion engine in a predefined situation;
    hydrogen addition ratio setup means for setting the ratio of hydrogen gas addition to said hydrocarbon fuel; and
    hydrogen gas addition ratio adjustment means for increasing said ratio of hydrogen gas addition when said fuel vapor is purged into said intake path.

2. The control system for said hydrogen addition internal combustion engine according to claim 1, wherein said hydrogen gas addition ratio adjustment means increases said ratio of hydrogen gas addition when the amount of fuel vapor purge into said intake path is not smaller than a predetermined value.

3. A control system for a hydrogen addition internal combustion engine that uses hydrocarbon fuel and hydrogen gas as combustion fuel, said control system comprising:
    a canister for adsorbing fuel vapor generated in a tank for storing said hydrocarbon fuel;
    purge unit for purging said fuel vapor into an intake path of said hydrogen addition internal combustion engine in a predefined situation;
    hydrogen addition ratio setup unit for setting the ratio of hydrogen gas addition to said hydrocarbon fuel; and
    hydrogen gas addition ratio adjustment unit for increasing said ratio of hydrogen gas addition when said fuel vapor is purged into said intake path.

4. The control system for said hydrogen addition internal combustion engine according to claim 3, wherein said hydrogen gas addition ratio adjustment unit increases said ratio of hydrogen gas addition when the amount of fuel vapor purge into said intake path is not smaller than a predetermined value.

* * * * *